US009105419B2

(12) United States Patent
Claeys

(10) Patent No.: US 9,105,419 B2
(45) Date of Patent: Aug. 11, 2015

(54) PLUNGER MECHANISM FOR SWITCH APPLICATIONS

(75) Inventor: Patrick S. Claeys, Sunrise, FL (US)

(73) Assignee: MOTOROLA SOLUTIONS, INC., Schaumburg, IL (US)

(*) Notice: Subject to any disclaimer, the term of this patent is extended or adjusted under 35 U.S.C. 154(b) by 350 days.

(21) Appl. No.: 13/299,902

(22) Filed: Nov. 18, 2011

(65) Prior Publication Data

US 2013/0125678 A1 May 23, 2013

(51) Int. Cl.

| | |
|---|---|
| ***F16H 35/18*** | (2006.01) |
| ***H01H 19/11*** | (2006.01) |
| ***G05G 5/06*** | (2006.01) |
| *G05G 1/08* | (2006.01) |

(52) U.S. Cl.

CPC ................. *H01H 19/11* (2013.01); *G05G 5/06* (2013.01); *H01H 19/115* (2013.01); *G05G 1/08* (2013.01); *Y10T 74/20636* (2015.01)

(58) Field of Classification Search

CPC ........... G05G 1/00; G05G 5/00; G05G 23/00; G05G 5/06; G05G 1/08; H01H 1/00; H01H 13/00; H01H 19/11; H01H 19/115

USPC .............. 74/10 R, 10.41, 10.2, 527; 200/296, 200/330, 336, 564

See application file for complete search history.

(56) References Cited

U.S. PATENT DOCUMENTS 2,060,377 A * 11/1936 Knodle ...................... 200/61.91
3,333,079 A 7/1967 Michaelson
3,662,618 A 5/1972 Kroll et al.
3,754,106 A 8/1973 MacDonald
4,035,759 A 7/1977 Van Benthuysen
4,570,669 A * 2/1986 Pauliukonis .................. 137/528
4,993,280 A 2/1991 Olkoski et al.
5,086,200 A 2/1992 Kline et al.
5,159,706 A 10/1992 Hodsdon
5,168,982 A * 12/1992 Hakanen et al. .............. 200/342
5,669,489 A * 9/1997 von Ende ...................... 200/570
5,784,688 A 7/1998 Siddoway
5,855,191 A * 1/1999 Blowers et al. ............ 123/90.36
6,058,296 A 5/2000 Lian et al.

(Continued)

FOREIGN PATENT DOCUMENTS

DE 19706677 A1 8/1998
DE 2008014566 A1 9/2009
DE 2009048330 A1 4/2011

OTHER PUBLICATIONS

U.S. Appl. No. 12/818,885, filed Jun. 18, 2010.

(Continued)

*Primary Examiner* — William Kelleher
*Assistant Examiner* — Zakaria Elahmadi
(74) *Attorney, Agent, or Firm* — Barbara R. Doutre; Daniel R. Bestor

(57) ABSTRACT

A plunger mechanism (100) is formed of a plunger (102) having a cylindrical body with a half-spherical tip (104). The plunger mechanism (100) is overmolded (108) such that half-spherical tip (104) is exposed. The plunger mechanism provides a drop-in component for a housing (404) having a rotary control (402) with one or more detents (408). The exposed half-spherical tip (104) makes contact with the detents (408) as a rotary control knob (406) is rotated thereby providing improved torque and tactility without the use of springs and without captivation issues.

24 Claims, 5 Drawing Sheets

(56) References Cited

U.S. PATENT DOCUMENTS

| | | | | |
|---|---|---|---|---|
| 6,307,304 | B1 | 10/2001 | Yorio et al. | |
| 6,489,578 | B1 | 12/2002 | Jung et al. | |
| 6,927,348 | B1 | 8/2005 | Schmidt | |
| 7,069,807 | B2 * | 7/2006 | Girlando et al. | 74/473.18 |
| 7,232,354 | B2 * | 6/2007 | Olson et al. | 441/7 |
| 7,592,562 | B1 | 9/2009 | Vanderwege et al. | |
| 7,599,708 | B2 | 10/2009 | Garcia et al. | |
| 7,767,916 | B2 * | 8/2010 | Kurihara et al. | 200/38 R |
| 7,804,036 | B2 * | 9/2010 | Ishigaki et al. | 200/336 |
| 7,834,865 | B2 | 11/2010 | Jannasch et al. | |
| 7,971,498 | B2 * | 7/2011 | Meyer et al. | 74/10.41 |
| 7,987,738 | B2 * | 8/2011 | Kaps et al. | 74/10.41 |
| 8,415,577 | B2 | 4/2013 | Garcia et al. | |
| 2001/0024156 | A1 | 9/2001 | Kuratani | |
| 2003/0150079 | A1 * | 8/2003 | Takai et al. | 16/26 |
| 2005/0184595 | A1 * | 8/2005 | Foster et al. | 307/112 |
| 2006/0082554 | A1 | 4/2006 | Caine et al. | |
| 2006/0258404 | A1 | 11/2006 | Arneson et al. | |
| 2007/0013368 | A1 | 1/2007 | Garcia et al. | |
| 2008/0055241 | A1 * | 3/2008 | Goldenberg et al. | 345/156 |
| 2008/0173112 | A1 * | 7/2008 | Hiroe et al. | 74/10.41 |
| 2008/0236329 | A1 | 10/2008 | Slavin et al. | |
| 2009/0038921 | A1 | 2/2009 | Kaps et al. | |
| 2009/0069155 | A1 * | 3/2009 | Dickinson | 477/133 |
| 2010/0071649 | A1 | 3/2010 | Janowiak | |
| 2010/0125393 | A1 | 5/2010 | Jarvinen et al. | |
| 2010/0140059 | A1 | 6/2010 | Kagami et al. | |
| 2010/0330817 | A1 * | 12/2010 | van Ekstrom | 439/32 |
| 2011/0132112 | A1 * | 6/2011 | Hisamune et al. | 74/10.41 |
| 2011/0203406 | A1 * | 8/2011 | Macintyre | 74/527 |
| 2011/0281533 | A1 | 11/2011 | Deleus et al. | |

OTHER PUBLICATIONS http://www.alps.com/WebObjects/catalog.woa/E/HTML/Switch/Rotary/SRBM/SRBM120700.html—ALPS Manufacturer of Electronic Components—Rotary Switch—Details—Specification—Copyright 1995-2010—6 pages.

International Search Report for International Patent Application No. PCT/US2012/60972 mailed Feb. 1, 2013.

International Search Report and Written Opinion for International Application No. PCT/US2011/038835 mailed on Oct. 5, 2011.

Notice of Allowance mailed Jun. 12, 2012 in U.S. Appl. No. 12/818,885, Jorge L Garcia, filed Jun. 18, 2010.

Notice of Allowance mailed Feb. 5, 2013 in U.S. Appl. No. 12/818,885, Jorge L Garcia, filed Jun. 18, 2010.

Snap Action Rotary Switch Adapter, Jun. 1973, IBM Technical Disclosure Bulletin, volume No. 16, issue No. 1, page No. 55, an adapter connected between an operating knob and the shaft of a commercial rotary switch for the purpose of creating a snap action between operating positions.

* cited by examiner

PLUNGER MECHANISM FOR SWITCH APPLICATIONS

FIELD OF THE INVENTION

The present invention relates generally to a plunger mechanism, and more particularly to a plunger mechanism for increased torque and improved tactility for a switch used in a communication device.

BACKGROUND

Communication devices, such as two-way radios, often include at least one rotary control knob for controlling such operational features as volume adjustment and channel change. When operating in ruggedized environments, for example public safety environments, a communication device with a good user interface with strong tactile feedback is highly desirable. Users working in public safety environments often carry the device at their side on a belt clip, which requires the user to control knobs and switches without actually looking down at the device. In some applications, the control knobs and switches need to be accessible by users wearing gloves and/or working under noisy and high temperature conditions. A rotary control with a strong user interface is of particular importance in these environmental conditions.

Rotary controls have utilized ball plunger mechanisms in the past to increase torque and improve tactile feedback. However, common off-the-shelf ball plungers utilize springs and materials that can incur decreased performance and deformation after life-cycling and continued on/off usage. Ball plungers can also require lubrication especially in rotary applications which adds potential contamination, complexity, cost, and leads to potential parts degradation.

Additionally, several manufacturing related issues can arise with the use of ball plunger mechanisms including ball captivation problems wherein retention features are inadequate causing that ball to fall out. Unwanted “clicks” may occur when actuating a loose ball and barrel.

Accordingly, there is a need for an improved plunger mechanism that can be applied in switch applications, such as rotary control applications in communication devices.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
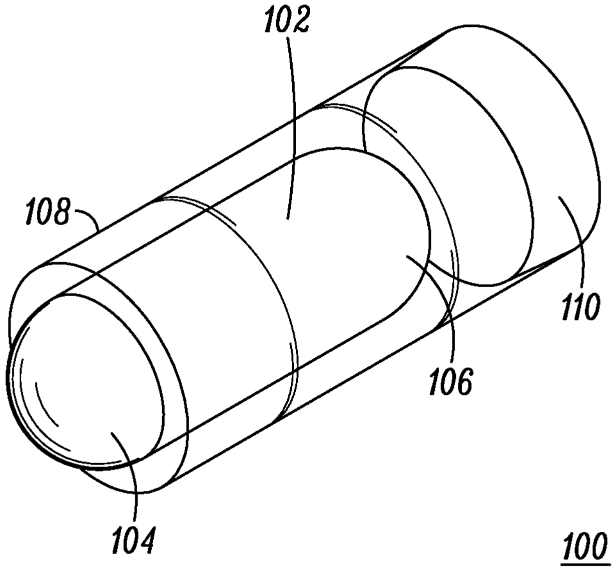
FIG. 1 is a plunger mechanism formed in accordance with the various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in apparatus components providing a purely mechanical-based solution for a control knob.

Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Briefly, there is provided herein a plunger mechanism for use in a rotary control switch which provides increased torque and tactile feedback. The plunger mechanism provides an improvement over past complex ball plungers by being lower cost, less complex, and readily manufacturable. The improved plunger mechanism is highly adaptable to applications that require a small drop-in solution to add force/torque or tactility. The plunger mechanism is highly suitable to applications in which products are exposed to high-temperature and harsh-environments. Products, such as communication devices operating within a public safety environment, can benefit from the increased torque and tactility of a rotary switch incorporating the improved plunger mechanism.

In this document, relational terms such as first and second, top and bottom, and the like may be used solely to distinguish one entity or action from another entity or action without necessarily requiring or implying any actual such relationship or order between such entities or actions. The terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by “comprises . . . a” does not, without more constraints, preclude the existence of additional identical elements in the process, method, article, or apparatus that comprises the element.

FIG. 1 is a plunger mechanism 100 formed in accordance with the various embodiments. The plunger mechanism 100 comprises a plunger 102 having a cylindrical body with first and second ends 104, 106, the first end 104 being a half-spherical end or tip. The plunger mechanism 100 further comprises a sleeve 108 overmolded to the plunger 102 such that the first end 104 of the plunger protrudes through the sleeve so as to expose the half-spherical end. The sleeve 108 is shown as transparent so that the interior elements can be viewed. Plunger 102 may be formed of two spherical ends, as shown in FIG. 1 or, as will be shown in subsequent views, the plunger 102 may be formed of one spherical end and one flat end.

The sleeve is made from a low-compression set material, such as silicone or other rubber of suitable durometer or hardness depending on the application. For environmentally harsh conditions, the sleeve material may be selected to be resistant to chemical corrosion, high-temperature, and life-cycle wear. Depending on the application, the sleeve material may also be made from a natural lubricant material, such as oil bleeding silicone, low coefficient of friction liquid injection molding (LIM), or compression molded silicone, to name a few.

Depending on the desired amount of torque, a backer element 110 may be coupled to one end of the sleeve to provide an increased surface area for compression of the second end 106 of plunger 102. The stiff backer element 110 may be made of a rigid plastic such as glass filled polycarbonate or the like. The backer element material should be selected to provide adhesion to the sleeve 108. The silicone sleeve 108 bonds to the backer element 110 during the molding process. Since the materials are selected for natural adhesion during the molding process, no glue is required in the formation of plunger mechanism 100.

For applications in which a backer element 110 is not needed or desired, the sleeve 108 is simply molded over the second end 106 of plunger 102.

The plunger is made of a hard material which provides resistance to corrosion, such as a stainless steel metal or very rigid plastic. The metal may be polished to provide, depending on the application, improved wear resistance and smooth function. The first end 102 operates as a plunger tip and its half spherical shape provides the necessary feedback where interacting with a mating part. The dimensions (length, diameter, width, depth) of the plunger 102 are dependent on the application. The plunger may be solid for increased weight and torque, or hollow to provide decreased weight in lighter applications. For example deep draw steel sheet metal could be used for a lighter application, and 440C hardened stainless steel could be used for a heavier application. The plunger mechanism 100 does not require the use of a spring or ball bearing making it easy to manufacture and assemble.

Figure 2:
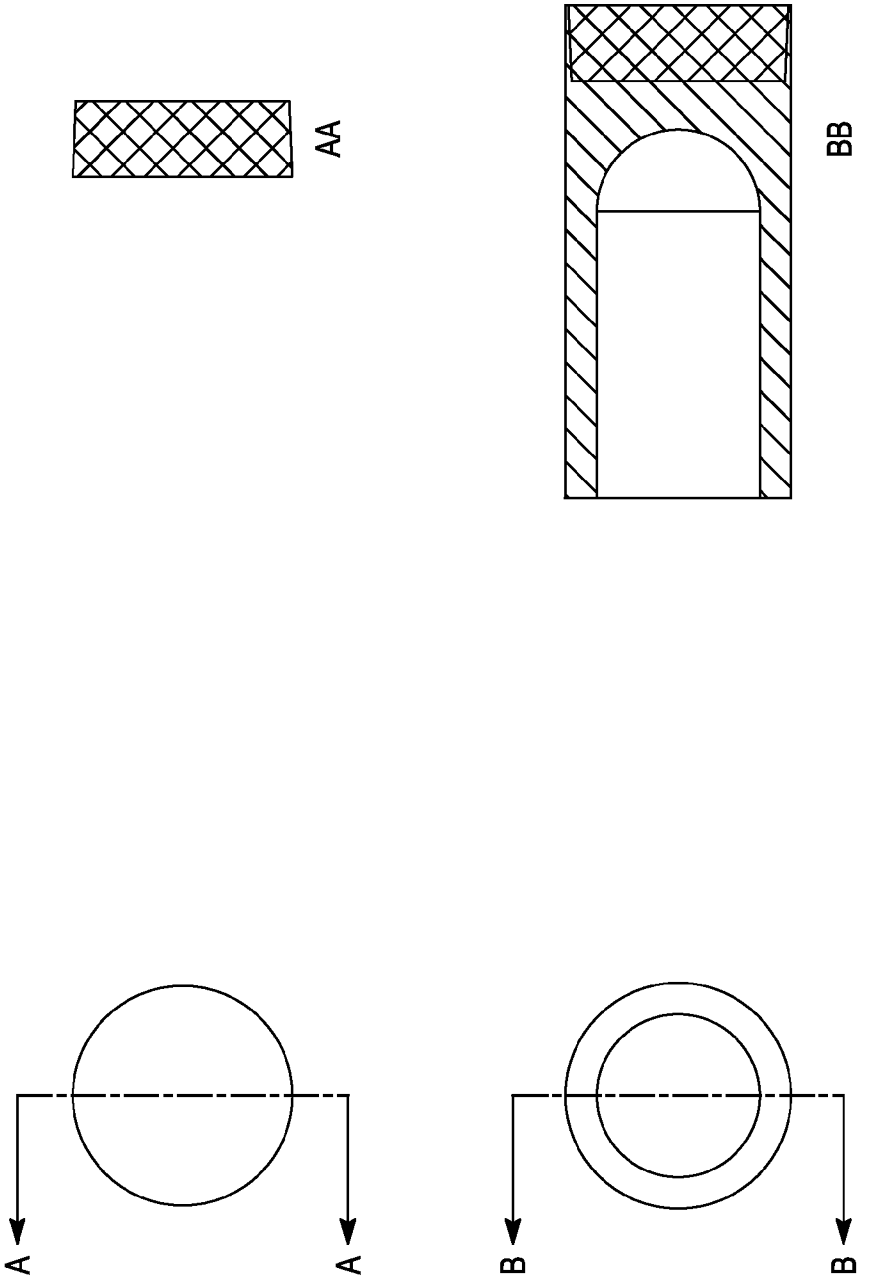
FIG. 2 shows cross-sectional front and side views of the sleeve in accordance with the various embodiments.

FIG. 2 shows cross-sectional front and side views of the sleeve 108 and backer element 110 in accordance with the various embodiments (without showing plunger 102). Cut A-A shows the outer circumference of the backer element 110. Cut B-B shows an opening of the sleeve 108 which overmolds the cylindrical body 102 (not shown) and the backer element 110.

While a pre-made sleeve might be used instead of the overmolded sleeve 108, a premade sleeve is far less desirable as it involves more assembly, lack of adhesion and risk of loose parts. Using the overmolded sleeve 108 to form the plunger mechanism 100 is far more desirable as the adhesion properties provide for an improved drop-in component that eliminates loose individual piece parts, as will further be shown and described in conjunction with FIGS. 4 and 5.

As mentioned previously, for applications in which a backer element 110 is not needed or desired, the sleeve 108 would simply be molded over the second end 106 of plunger 102.

Figure 3B:
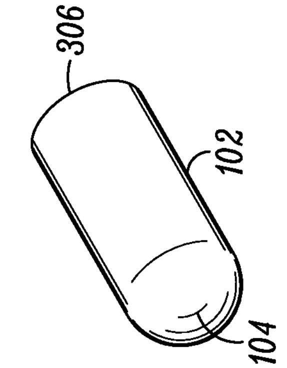
FIG. 3B shows an alternative embodiment to the plunger of FIG. 1.
Figure 3A:
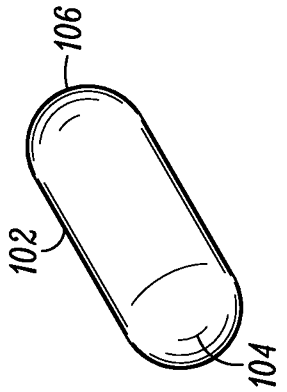
FIG. 3A shows the plunger of FIG. 1 in accordance with and embodiment.

FIGS. 3A shows the plunger 102 of FIG. 1 while FIG. 3B shows an alternative embodiment to the plunger of FIG. 1. FIG. 3A shows the plunger 102 having first and second half-spherical ends 104, 106. FIG. 3B shows alternative embodiments with plunger 100 having a first half-spherical end 104 and a second flat end 306. Applications requiring more torque can benefit using the plunger having the second flat end 306, particularly if used in conjunction with the backer element 110 which provides an increased surface area for compression.

The plunger mechanism 100 provided by the various embodiments is highly adaptable to applications that require a small drop-in solution to add force/torque or tactility. The plunger mechanism 100 is highly suitable to applications in which products are exposed to high-temperature and harsh-environments. Unwanted clicks and other captivation issues can now be avoided as the use of a ball and spring has been eliminated. The plunger mechanism 100 provides a drop-in component for increasing on/off detent without adding complexity to a switch as will be described in conjunction with FIGS. 4 and 5.

Figure 4:
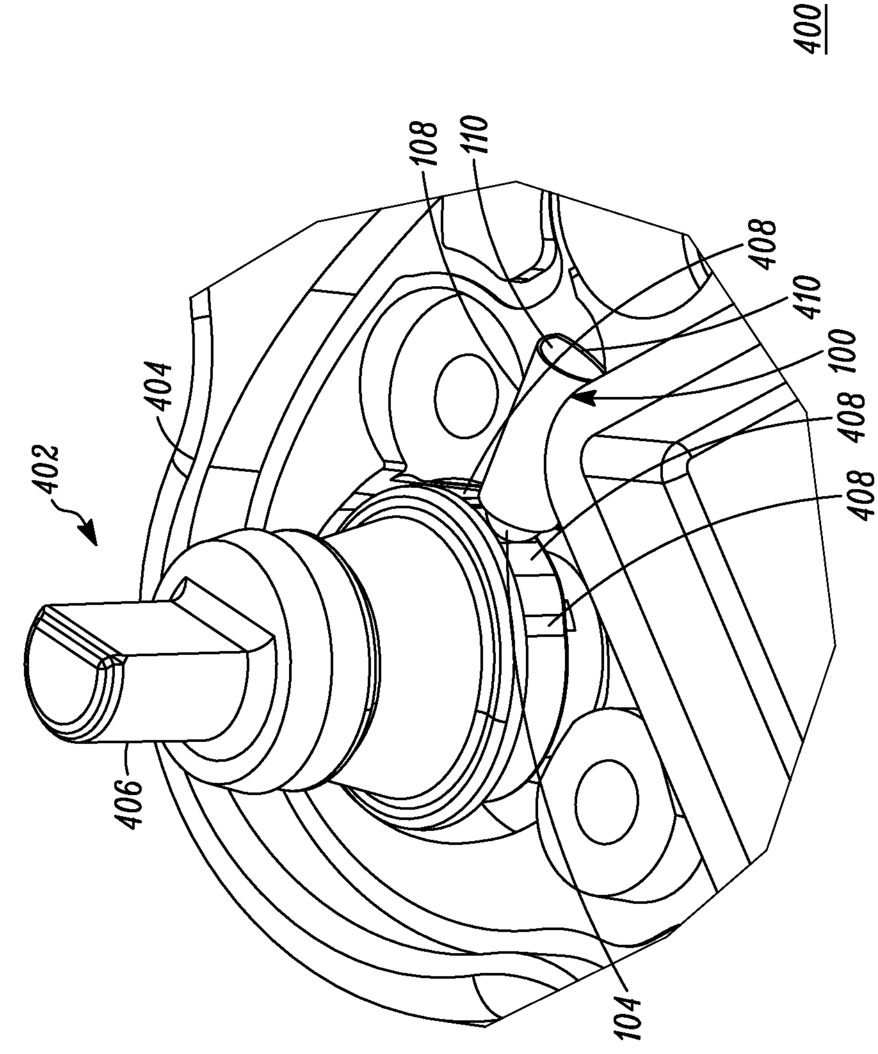
FIG. 4 is a partial top isometric view of a communication device utilizing a plunger mechanism formed and operating in accordance with the various embodiments.
Figure 5:
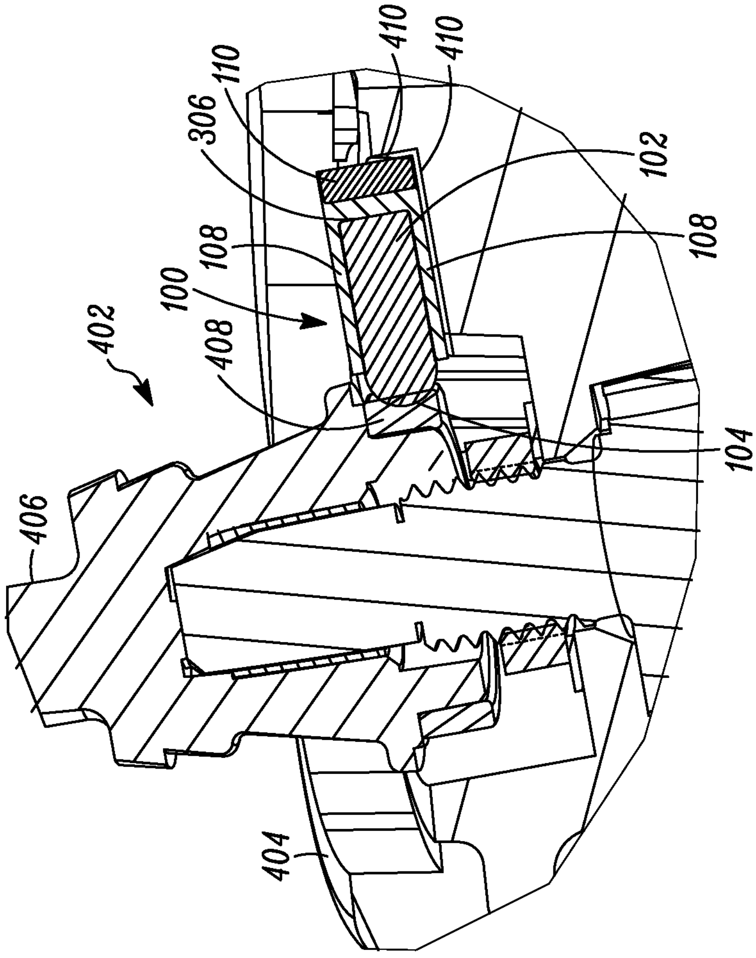
FIG. 5 is a partial cross-sectional of the communication device utilizing the plunger mechanism formed and operating in accordance with the various embodiments.

FIG. 4 is a partial top isometric view of a communication device 400 utilizing the plunger mechanism 100 formed and operating in accordance with the various embodiments. FIG. 5 is a partial cross-sectional of the communication device 400 utilizing the plunger mechanism 100 formed and operating in accordance with the various embodiments. Communication device 400 may be a radio, such as a public safety radio or other communication device, having a rotary control 402 in which increased torque and improved tactility are desired.

Referring to FIGS. 4 and 5, the communication device 400 comprises a housing 404 upon which is coupled the rotary control 402, the rotary control comprising a control knob 406 and a plurality of detents 408. The coupling of the rotary control 402 to housing 404 can be achieved using well known coupling and mounting techniques and as such will not be described in further detail. Different types of rotary controls 402 may be utilized as long as implemented with detents 408. Detents 408 may be formed of hard-stops, bumps, single or multi-toothed gears, or undulating-type features to name a few. The housing comprises a cylindrical recess, or pocket, 410 within which to drop in and retain the plunger mechanism 100. The protruding half-spherical tip 104 of the plunger 102 is located between two detents 408 of the rotary control 402. The cylindrical recess 410 provides a back wall against which the plunger mechanism is compressed. Neither the plunger mechanism 100 nor the rotary control 402 requires the use of a spring for torque, tactility or feedback. In FIG. 5, the backer element 110 alternative is shown. As mentioned previously, the backer element 110 can be used to provide an increased surface area for compression.

As a practical example, a plunger formed of 440C solid stainless steel having approximate dimensions of 6.5 mm in length, 205 mm in width has been incorporated has been implemented to provide a torque value of 6-12 inch-ounces.

As the rotary control 402 is rotated via knob 406, the detents 408 hit the half-spherical tip 104 of the plunger mechanism 100 at a predetermined point of rotation. As the detents 408 hit the half-spherical tip 104 the compression and decompression of the plunger mechanism 100 riding over the detents 408 provides increased torque and tactility feedback. As the rotary control 402 is turned, the detents 408 rotate, each detent providing resistance by which the plunger is compressed into the cylindrical recess 410—thus providing rotational torque for a stiff on-off or transitional stage tactile feedback. The remainder of rotation may or may not include detents depending on the application.

For example, a rotary control used in volume adjustment may only utilize a single tooth gear in conjunction with the ball plunger mechanism 100 to provide on/of torque. In another example, a rotary control used for frequency/channel change options may utilize a multi-tooth gear in conjunction with the ball plunger mechanism 100 to provide stiff torque at each channel change transition. The same plunger mechanism 100 is thus readily suited to many switch applications. A harder detent action can now be achieved by the incorporation of plunger mechanism 100 without impacting the function of the switch.

Accordingly, an improved plunger mechanism 100 has been provided which is highly adaptable to applications that require a small drop-in solution to add force, torque and tactility. This drop-in approach eliminates the need for any springs thereby lowering cost and facilitating assembly. Unwanted clicks and other captivation issues incurred by previous ball plunger type approaches can now be avoided. The plunger mechanism 100 is particularly useful in rotary control applications requiring an easily discernable on/off switch or other functional transition switch. The highly resistant plunger mechanism 100 increases torque and tactility thereby providing an improved user interface for a communication device operating under harsh-environments, such as high temperature, corrosive and/or noisy environments.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A plunger and rotary control mechanism comprising:

a plunger having a cylindrical body with a first end and a second end, the first end being half-spherical;

a silicone or rubber sleeve molded or assembled over the plunger so as to surround the second end of the plunger and to entirely circumferentially surround an axial length of the cylindrical body of the plunger extending from the second end towards the first end, the first end of the plunger protruding through the sleeve so as to expose the half-spherical first end; and a rotary control comprising a detent which rotates in response to the rotary control being rotated, the rotation of the detent hitting the half-spherical tip of the plunger at a predetermined point of rotation generating a rotational torque.

2. The mechanism of claim 1, wherein the second end of the plunger is one of a half-spherical end and a flat end.

3. The mechanism of claim 1, wherein the plunger mechanism operates as a component for increasing detent.

4. The mechanism of claim 1, wherein the sleeve extends beyond and behind the second end of the plunger, allowing the plunger mechanism to be compressible without a separate spring.

5. The mechanism of claim 1, wherein the plunger is hollow.

6. The mechanism of claim 1, wherein the plunger is solid.

7. The mechanism of claim 1, wherein the sleeve is formed of tear-resistant silicone or rubber material.

8. The mechanism of claim 1, wherein the sleeve is formed of a material resistant to predetermined corrosive materials, to a predetermined temperature range, and to a predetermined life-cycle wear.

9. The mechanism of claim 1, further comprising:

a backer element coupled to a rear portion of the sleeve adjacent the second end of the plunger so as to form a casing adjacent the second end of the plunger.

10. The plunger mechanism of claim 9, wherein the backer element provides an increased surface area for plunger compression adjacent the second end of the plunger.

11. A communication device, comprising:

a housing;

a cylindrical recess formed within the housing;

a plunger mechanism seated within the cylindrical recess, the plunger mechanism comprising:

a plunger having a cylindrical body with a first end and a second end, the first end being half-spherical; and a silicone or rubber sleeve molded or assembled over the plunger so as to surround the second end of the plunger and to entirely circumferentially surround an axial length of the cylindrical body of the plunger extending from the second end towards the first end, the first end of the plunger protruding through the sleeve so as to expose the half-spherical first end; and a rotary control coupled to the housing, the rotary control comprising a detent which rotates in response to the rotary control being rotated, the rotation of the detent hitting the half-spherical tip of the plunger mechanism at a predetermined point of rotation generating a rotational torque.

12. The communication device of claim 11, the plunger mechanism further comprising a backer element coupled to a rear portion of the sleeve adjacent the second end of the plunger so as to form a casing adjacent the second end of the plunger wherein the rear portion of the sleeve overmolds and entirely circumferentially surrounds at least a portion of the backer element and bonds the backer element to the plunger.

13. The communication device of claim 12, wherein the backer element provides an increased surface area for compression of the plunger mechanism into the cylindrical recess.

14. The communication device of claim 11, wherein the sleeve extends beyond and behind the second end of the plunger, allowing the plunger mechanism to be compressible without a separate spring.

15. The communication device of claim 11, wherein the communication device comprises a portable radio or a vehicular radio.

16. The communication device of claim 11, wherein the plunger mechanism provides increased on-off detent.

17. The communication device of claim 11, wherein the plunger mechanism provides a drop-in component into the cylindrical recess for increased on/off detent.

18. The communication device of claim 11, wherein the rotary control comprises additional detents and the plunger mechanism provides transitional stage tactile feedback in response to being rotated against the additional detents.

19. The communication device of claim 11, wherein the rotary control operates as a volume adjustment control of the communication device, and the plunger mechanism provides an on-off detent for the volume adjustment control.

20. The communication device of claim 11, wherein the rotary control comprises additional detents and operates to control channel change of the communication device, the plunger mechanism providing transitional torque at each channel change.

21. The mechanism of claim 1, wherein the sleeve is a silicone sleeve and the silicone comprises compression molded silicone.

22. The mechanism of claim 9, wherein the rear portion of the sleeve overmolds and entirely circumferentially surrounds at least a portion of the backer element and bonds the backer element to the plunger.

23. The mechanism of claim 1, wherein the sleeve extends beyond the second end of the plunger in substantially a same shape as the portion entirely circumferentially surrounding the portion of the cylindrical body of the plunger.

24. The communication device of claim 11, wherein the sleeve extends beyond the second end of the plunger in substantially a same shape as the portion entirely circumferentially surrounding the portion of the cylindrical body of the plunger.

* * * * *